(12) United States Patent
Chen et al.

(10) Patent No.: US 12,011,817 B2
(45) Date of Patent: Jun. 18, 2024

(54) ELECTRICAL TOOL HAVING DRIVING SHOCK ABSORBING STRUCTURE

(71) Applicant: BASSO INDUSTRY CORP., Taichung (TW)

(72) Inventors: Yu-Da Chen, Taichung (TW); Ching-Chih Ho, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 17 days.

(21) Appl. No.: 18/092,775

(22) Filed: Jan. 3, 2023

(65) Prior Publication Data

US 2023/0211488 A1 Jul. 6, 2023

(30) Foreign Application Priority Data

Jan. 5, 2022 (TW) .................................. 111100416

(51) Int. Cl.
*B25F 5/00* (2006.01)
*B23Q 5/04* (2006.01)

(52) U.S. Cl.
CPC .............. *B25F 5/006* (2013.01); *B23Q 5/043* (2013.01)

(58) Field of Classification Search
CPC ................................ B25F 5/006; B23Q 5/043
See application file for complete search history.

(56) References Cited

U.S. PATENT DOCUMENTS

2010/0193206 A1* 8/2010 Teng ....................... B25B 21/02
173/48

* cited by examiner

*Primary Examiner* — Michelle Lopez
(74) *Attorney, Agent, or Firm* — Chun-Ming Shih; HDLS IPR SERVICES

(57) ABSTRACT

An electrical tool includes a housing, a motor, a bearing set and a shock-absorbing element. The motor is disposed in the housing and has a driving shaft and a nut. The bearing set is arranged on a side of the motor and includes a bearing seat, a bearing and a tool spindle. The tool spindle has a slot disposed at one end thereof facing the motor, and another end thereof is disposed protrusively from the bearing seat. One end of the driving shaft is combined in the slot through the nut. The shock-absorbing element sheathes the nut and is attached to an inner wall of the slot to reduce the vibration and noise during the operation of the electrical tool.

10 Claims, 4 Drawing Sheets

ELECTRICAL TOOL HAVING DRIVING SHOCK ABSORBING STRUCTURE

BACKGROUND OF THE DISCLOSURE

Technical Field

This disclosure relates to an electrical tool, and more particularly relates to an electrical tool having a driving shock absorbing structure.

Description of Related Art

An electrical tool is not only time-saving and labor-saving in using, but also one of the indispensable tools in the engineering field or life.

Moreover, a tool spindle of the electrical tool is usually driven to rotate through the shaft of the motor. Generally speaking, the shaft of the motor and the tool spindle need to have the same concentricity to facilitate transmission. However, the machining process and assembly process may cause deviation to the concentricity between the shaft of the motor and the tool spindle during, and noise and vibration may be generated when the electrical tool works. As a result, user may not able to hold the power tool stably.

In view of the above drawbacks, the inventor proposes this disclosure based on his expert knowledge and elaborate researches in order to solve the problems of related art.

SUMMARY OF THE DISCLOSURE

One object of this disclosure is to provide an electrical tool having a driving shock absorbing structure to reduce the vibration and noise during the operation and to enhance the handling of holding the electrical tool in operation, and the user may hold the electrical tool stably.

In order to achieve the above objects, this disclosure is an electrical tool having a driving shock absorbing structure, and the electrical tool includes a housing, a motor, a bearing set and a shock-absorbing element. The motor is disposed in the housing. The motor has a driving shaft and a nut mounted on the driving shaft. The bearing set is arranged on a side of the motor. The bearing set includes a bearing seat, at least one bearing disposed in the bearing seat and a tool spindle inserted in the bearing seat. The tool spindle has a slot disposed on one end thereof facing the motor, and another end of the tool spindle is disposed protrusively from the bearing seat. One end of the driving shaft is combined in the slot through the nut. The shock-absorbing element sheathes the nut and is attached to an inner wall of the slot.

In comparison with the related art, the electrical tool in this disclosure includes a shock-absorbing element disposed between the driving shaft of the motor and the tool spindle to eliminate the noise and vibration caused by the gap between the combination structure. Therefore, the shock-absorbing element may absorb the vibration and noise caused by the concentric deviation of the driving shaft and the tool spindle when the motor is starting, stopping or in operation. As a result, collisions between parts may be avoided. Moreover, a shock-absorbing rib may be arranged between the bearing set and the housing, and a shock-absorbing ring may be disposed between the motor and the housing to absorb the vibration between the driving mechanisms (such as the bearing set and the motor) and the housing. Furthermore, users may hold the electrical tool stably to enhance the handling of the electrical tool in operation.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
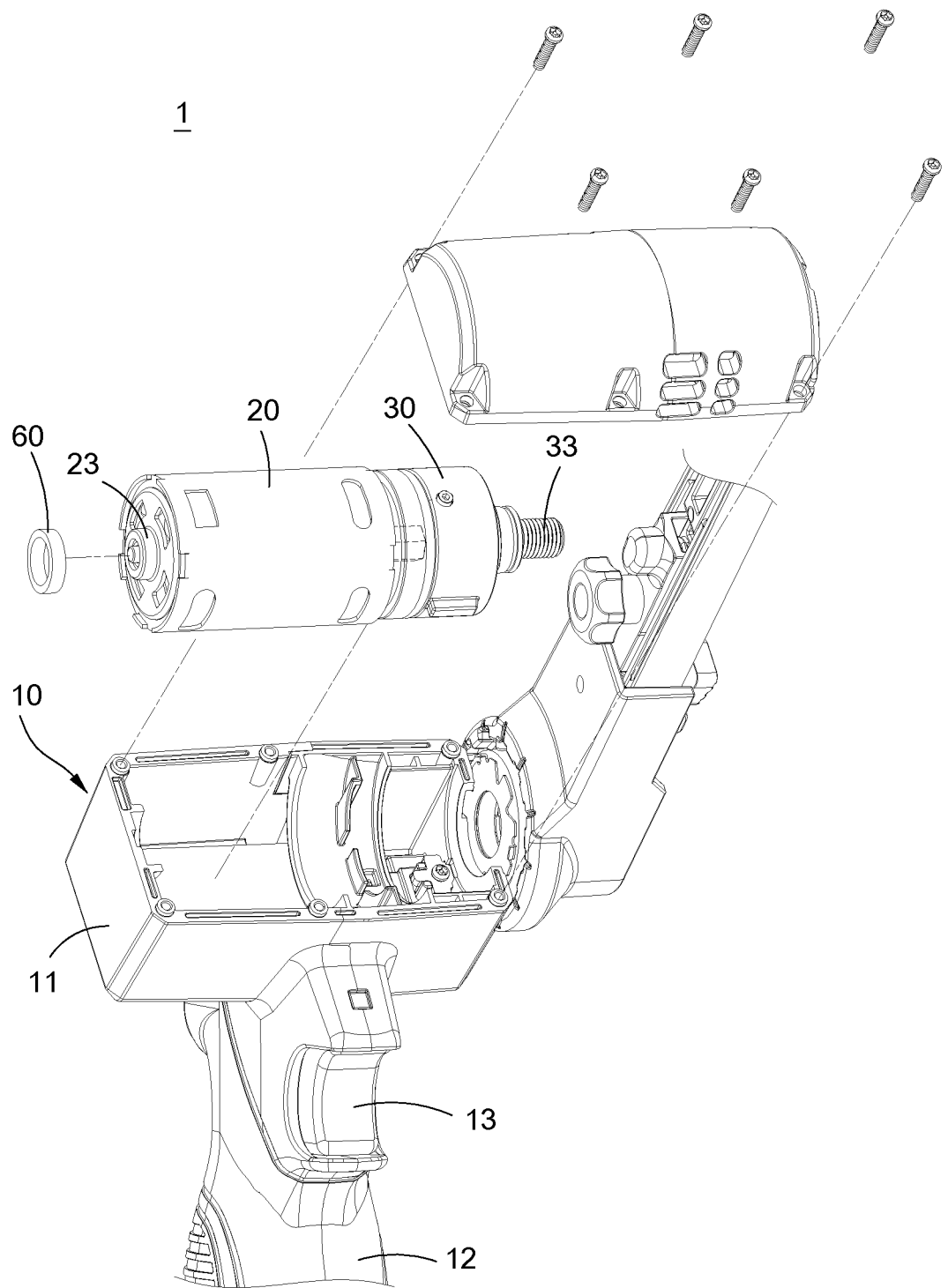
FIG. 1 is a perspective exploded view of the electrical tool in this disclosure.
Figure 2:
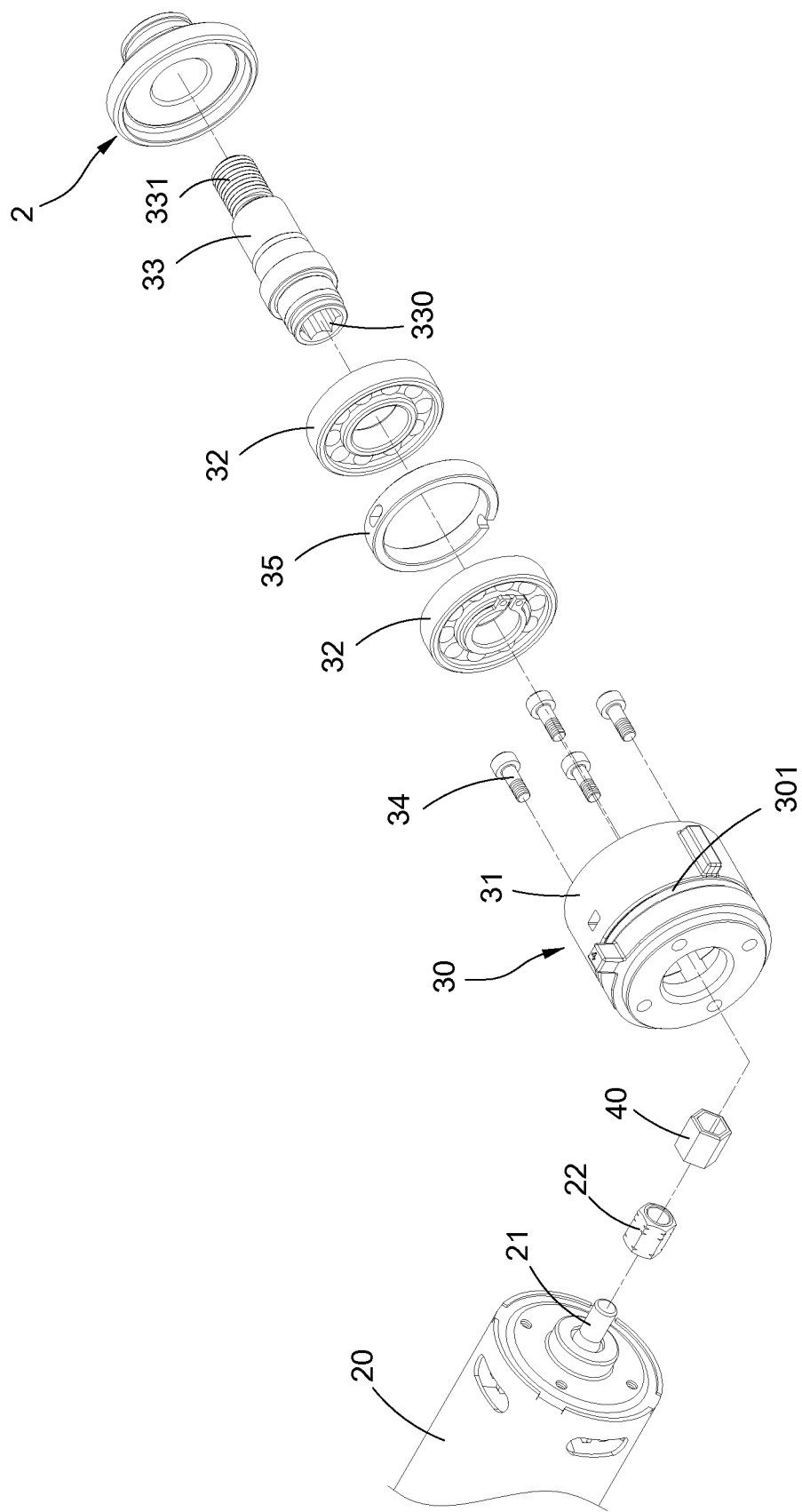
FIG. 2 is a perspective exploded schematic view of the motor and the bearing set in this disclosure.
Figure 3:
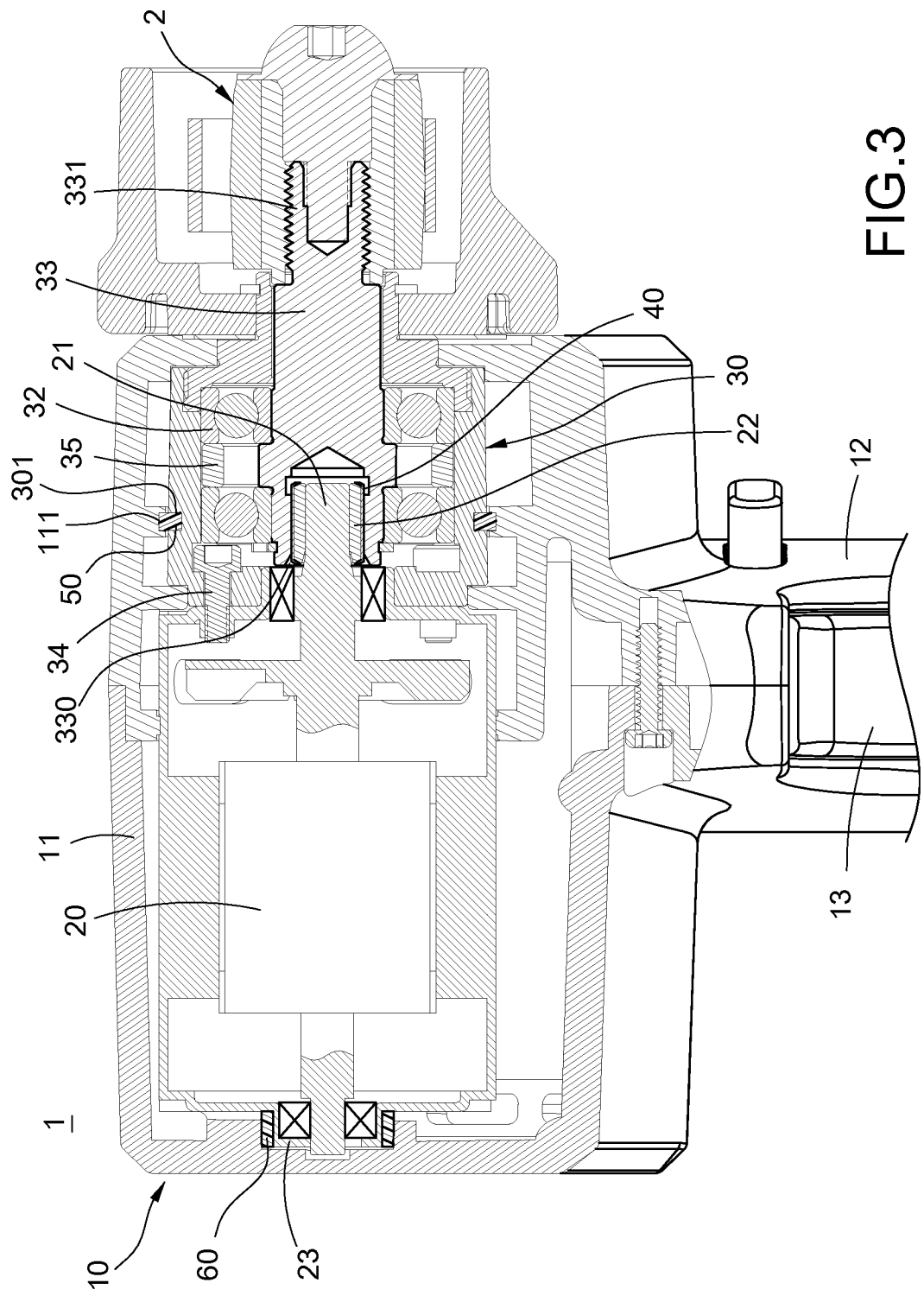
FIG. 3 is a cross-sectional view of the electrical tool in this disclosure.

Please refer to FIG. 1 to FIG. 3, which are a perspective exploded view of the electrical tool in this disclosure, a perspective exploded schematic view of the motor and the bearing set in this disclosure, and a cross-sectional view of the electrical tool in this disclosure. This disclosure is an electrical tool 1 having a driving shock absorbing structure. The electrical tool 1 includes a housing 10, a motor 20, a bearing set 30 and a shock-absorbing element 40. The bearing set 30 is combined on one side of the motor 20 and arranged in the housing 10 together with the motor 20. The shock-absorbing element 40 is disposed between the motor 20 and the bearing set 30 to absorb the vibration and noise when the motor 20 is in operation.

In this embodiment, the housing 10 includes a head shell 11 and a handle shell 12 connected to the head shell 11. The handle shell 12 is combined with an operation button 13.

The motor 20 is disposed in the head shell 11 of the housing 10. The motor 20 has a driving shaft 21 and a nut 22 mounted on and sheathing the driving shaft 21.

The bearing set 30 is arranged on one side of the motor 20. The bearing set 30 includes a bearing seat 31, at least one bearing 32 disposed in the bearing seat 31 and a tool spindle 33 inserted in the bearing seat 31. Moreover, the tool spindle 33 has a slot 330 disposed on one end thereof facing the motor 20, and another end of the tool spindle 33 is disposed protrusively from the bearing seat 50. Thus, one end of the driving shaft 21 is combined in the slot 330 through the nut 22.

It is worth noticing that a threaded portion 331 is disposed on the end of tool spindle 33 disposed protrusively from the bearing seat 31. The threaded portion 331 is provided for combining with a load element 2. As a result, the electrical tool 1 may work on a workpiece (not shown in figures) through combining the load element 2.

In this embodiment, the bearing set 30 further includes a plurality of fasteners 34. The bearing set 30 is fixed on one side of the motor 20 through the fasteners 34.

Furthermore, the shock-absorbing element 40 may be a flexible element capable of absorbing vibration. In this embodiment, the shock-absorbing element 40 is made of rubber. The shock-absorbing element 40 sheathes the nut 22 and is attached to an inner wall of the slot 330. In one embodiment of this disclosure, the nut 22 is a hexagonal nut, and the shock-absorbing element 40 is a hexagonal collar. Therefore, the shock-absorbing element 40 is tightly mounted on and sheathing the nut 22.

Specifically, in this embodiment, the number of the bearing 32 is multiple, and a plurality of bearings 32 are arranged spacedly in the bearing seat 31 and abut against the tool spindle 33. Additionally, the bearing set 30 further includes a spacer ring 35. Two sides of the spacer ring 35 respectively abut against the bearings 32 arranged spacedly.

It is worth noticing that the electrical tool 1 further includes a shock-absorbing rib 50. A first groove 301 is disposed on the outer surface of the bearing set 30, and a second groove 111 is disposed on the inner wall of the housing 10 at a position corresponding to the first groove 301. The shock-absorbing rib 50 is disposed between the first groove 301 and the second groove 111 to absorb the vibration therebetween.

In one embodiment of this disclosure, a protrusion 23 is disposed on the end of the motor 20, and a shock-absorbing ring 60 is combined on the outer edge of the protrusion 23. The shock-absorbing ring 60 is clamped between the protrusion 23 and an inner wall of the housing 10 to absorb the vibration therebetween.

Figure 4:
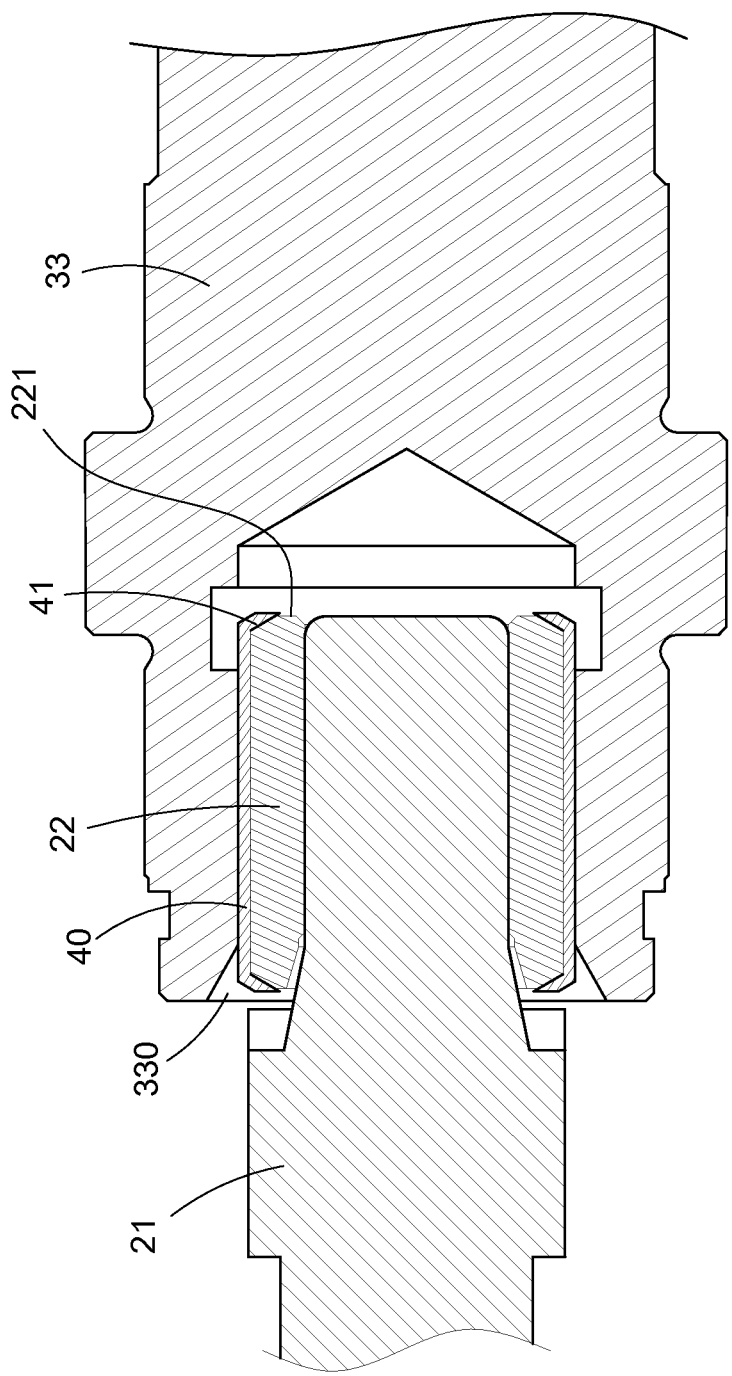
FIG. 4 is a cross-sectional view of the driving shaft and the tool spindle in this disclosure.

Please further refer to FIG. 4, which is a cross-sectional view of the driving shaft and the tool spindle in this disclosure. One end of the driving shaft 21 of this disclosure is combined with the nut 22, and the slot 330 is disposed on one end of the tool spindle 33. Furthermore, the shock-absorbing element 40 is mounted on and sheathing the nut 22. One end of the driving shaft 21 is fixed in the slot 330 by combining the nut 22 and being sheathed with the shock-absorbing element 40. Therefore, the driving shaft 21 is combined with the tool spindle 33.

It should be noted that two end edges 41 are disposed two sides of the shock-absorbing element 40 respectively, and two end surfaces 221 are disposed on two sides of the nut 22 respectively. Each end edge 41 of the shock-absorbing element 40 is extended to each end surface 221 of the nut 22.

While this disclosure has been described by means of specific embodiments, numerous modifications and variations could be made thereto by those skilled in the art without departing from the scope and spirit of this disclosure set forth in the claims.

What is claimed is:

1. An electrical tool, comprising:
   a housing;
   a motor, disposed in the housing, and comprising a driving shaft and a nut mounted on the driving shaft;
   a bearing set, arranged on a side of the motor, and comprising a bearing seat, at least one bearing disposed in the bearing seat and a tool spindle inserted in the bearing seat, wherein the tool spindle comprises a slot disposed on one end thereof facing the motor, and another end of the tool spindle is disposed protrusively from the bearing seat, and one end of the driving shaft is combined in the slot through the nut; and
   a shock-absorbing element, adapted to sheathe the nut and attached to an inner wall of the slot.

2. The electrical tool according to claim 1, wherein the nut comprises a hexagonal nut, and the shock-absorbing element comprises a hexagonal collar.

3. The electrical tool according to claim 1, wherein a number of the bearing is multiple, and a plurality of bearings are arranged spacedly in the bearing seat and abut against the tool spindle.

4. The electrical tool according to claim 3, wherein the bearing set further comprises a spacer ring, and two sides of the spacer ring abut against the bearings arranged spacedly.

5. The electrical tool according to claim 1, wherein a threaded portion is disposed on another end of tool spindle disposed protrusively from the bearing seat.

6. The electrical tool according to claim 1, further comprising a plurality of fasteners, and the bearing set is fixed on one side of the motor through the fasteners.

7. The electrical tool according to claim 1, wherein the shock-absorbing element is made of rubber.

8. The electrical tool according to claim 1, wherein two sides of the shock-absorbing element respectively have an end edge, and two sides of the nut respectively have an end surface, and the end edge of the shock-absorbing element is extended to the end surface of the nut.

9. The electrical tool according to claim 1, further comprising a shock-absorbing rib, wherein a first groove is disposed on an outer surface of the bearing set, and a second groove is disposed on an inner wall of the housing corresponding to the first groove, and the shock-absorbing rib is disposed between the first groove and the second groove.

10. The electrical tool according to claim 1, further comprising a shock-absorbing ring, wherein a protrusion is disposed on an end of the motor, and the shock-absorbing ring is combined on an outer edge of the protrusion, and the shock-absorbing ring is clamped between the protrusion and an inner wall of the housing.

* * * * *